Patented Mar. 27, 1934

1,952,755

UNITED STATES PATENT OFFICE 1,952,755

METHOD OF PREPARING 1-PHENYL 3,4-DIHYDROXY BENZENE

Adelbert W. Harvey, Pittsburgh, Pa., assignor to E. R. Squibb & Sons, New York, N. Y., a corporation of New York No Drawing. Original application August 20, 1931, Serial No. 558,333. Divided and this application May 7, 1932, Serial No. 609,986

4 Claims. (Cl. 260—154)

This application is a division of application Serial No. 558,333, filed August 20, 1931.

This invention relates to, and has for its object the provision of, an efficient method of preparing 1-phenyl 3,4-dihydroxy benzene.

In the practice of this invention 1-phenyl 3,4-dihydroxy benzene is made by heating 1-phenyl 3-halogen 4-X benzene, wherein X represents a hydroxyl or a halogen, with an aqueous alkali solution, preferably at a temperature exceeding 200° C.

As an example of the preparation of 1-phenyl 3,4-dihydroxy benzene, the turbid mixture of 25.55 g. of 1-phenyl 3-chloro 4-hydroxy benzene with a solution of 16 g. of sodium hydroxide (or 22 g. of anhydrous sodium carbonate) in 200 cc. of water is autoclaved for three hours at between 290 and 300° C. (or for five hours at about 240° C.). When the temperature has fallen to between 100 and 80° C., the charge, a dark solution, is removed and acidified with hydrochloric acid. The light brown precipitate, the crude product is filtered off and washed with cold water, and partially purified by dissolving in hot benzene, distilling to remove water completely, cooling to promote crystallization, and filtering off the crystals. On further distillation, under reduced pressure, the 1-phenyl 3,4-dihydroxy benzene solidifies in the receiver as an almost colorless mass. It crystallizes in white plates from a mixture of benzene and petroleum ether; it has a (corrected) melting point of between 144.8 and 145.2° C.; it is soluble in alcohol, acetone, chloroform, benzene, and several other organic solvents; it is slightly soluble in cold water, and somewhat more in hot; it reduces a silver nitrate solution; it gives no fluorescence when heated with phthalic anhydride and zinc chloride; its alkaline solution darkens on exposure to the air; and its diacetyl derivative crystallizes from a mixture of benzene and petroleum ether as fine long white plates having a (corrected) melting point of between 77.5 and 78.0° C.

Among other compounds from which 1-phenyl 3,4-dihydroxy benzene may be prepared is 1-phenyl 3,4-dichloro benzene.

It will be understood that the foregoing embodiment is merely illustrative and by no means limitative of this invention, which may assume various other forms—for instance, as to the reactants and procedures employed—within the scope of the appended claims:

I claim:

1. In the preparation of 1-phenyl 3,4-dihydroxy benzene, the step of heating 1-phenyl 3-halogen 4-hydroxy benzene with an aqueous solution of a compound selected from the class consisting of the hydroxides and carbonates of the alkali metals at a temperature exceeding 200° C.

2. In the preparation of 1-phenyl 3,4-dihydroxy benzene, the steps of heating 1-phenyl 3-halogen 4-hydroxy benzene with an aqueous solution of a compound selected from the class consisting of the hydroxides and carbonates of the alkali metals at a temperature exceeding 200° C. and acidifying.

3. In the preparation of 1-phenyl 3,4-dihydroxy benzene, the step of heating 1-phenyl 3-chloro 4-hydroxy benzene with an aqueous solution of a compound selected from the class consisting of the hydroxides and carbonates of the alkali metals at a temperature exceeding 200° C.

4. In the preparation of 1-phenyl 3,4-dihydroxy benzene, the steps of heating 1-phenyl 3-chloro 4-hydroxy benzene with an aqueous solution of a compound selected from the class consisting of the hydroxides and carbonates of the alkali metals at a temperature exceeding 200° C. and acidifying.

ADELBERT W. HARVEY.